US012272348B2

(12) United States Patent
Ramabhadran et al.

(10) Patent No.: US 12,272,348 B2
(45) Date of Patent: Apr. 8, 2025

(54) CONFORMER-BASED SPEECH CONVERSION MODEL

(71) Applicant: Google LLC, Mountain View, CA (US)

(72) Inventors: Bhuvana Ramabhadran, Mt. Kisco, NY (US); Zhehuai Chen, Jersey City, NJ (US); Fadi Biadsy, Mountain View, CA (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 318 days.

(21) Appl. No.: 17/655,030

(22) Filed: Mar. 16, 2022

(65) Prior Publication Data

US 2022/0310056 A1 Sep. 29, 2022

Related U.S. Application Data

(60) Provisional application No. 63/312,195, filed on Feb. 21, 2022, provisional application No. 63/166,954, filed on Mar. 26, 2021.

(51) Int. Cl.
*G10L 13/027* (2013.01)
*G10L 13/047* (2013.01)
(Continued)

(52) U.S. Cl.
CPC .......... *G10L 13/027* (2013.01); *G10L 13/047* (2013.01); *G10L 15/16* (2013.01); *G10L 15/22* (2013.01); *G10L 25/18* (2013.01)

(58) Field of Classification Search
CPC ..... G10L 13/027; G10L 13/047; G10L 15/16; G10L 15/22; G10L 25/18; G10L 21/003; G10L 21/0364
See application file for complete search history.

(56) References Cited

U.S. PATENT DOCUMENTS

2019/0251952 A1* 8/2019 Arik .................... G10L 13/08
2020/0043518 A1* 2/2020 Jansson ................ G10L 25/81
(Continued)

FOREIGN PATENT DOCUMENTS

WO 2020171868 A1 8/2020

OTHER PUBLICATIONS

Biadsy et al. (Biadsy et al. "Parrotron: An end-to-end speech-to-speech conversion model and its applications to hearing-impaired speech and speech separation." arXiv preprint arXiv:1904.04169 (2019), (https://arxiv.org/abs/1904.04169).) (Year: 2019).*

(Continued)

*Primary Examiner* — Pierre Louis Desir
*Assistant Examiner* — Keisha Y. Castillo-Torres
(74) *Attorney, Agent, or Firm* — Honigman LLP; Brett A. Krueger; Grant Griffith

(57) ABSTRACT

A method for speech conversion includes receiving, as input to an encoder of a speech conversion model, an input spectrogram corresponding to an utterance, the encoder including a stack of self-attention blocks. The method further includes generating, as output from the encoder, an encoded spectrogram and receiving, as input to a spectrogram decoder of the speech conversion model, the encoded spectrogram generated as output from the encoder. The method further includes generating, as output from the spectrogram decoder, an output spectrogram corresponding to a synthesized speech representation of the utterance.

18 Claims, 7 Drawing Sheets

(51) Int. Cl.
  *G10L 15/16* (2006.01)
  *G10L 15/22* (2006.01)
  *G10L 25/18* (2013.01)

(56) References Cited

U.S. PATENT DOCUMENTS

2020/0051583 A1* 2/2020 Wu ................. G10L 13/047
2020/0066253 A1* 2/2020 Peng ................ G06F 17/18

OTHER PUBLICATIONS

Anmol et al. "Conformer: Convolution-augmented transformer for speech recognition." arXiv preprint arXiv:2005.08100 (2020). (https://arxiv.org/pdf/2005.08100.pdf) (Year: 2020).*

Dinh et al. ("Improving Speech Intelligibility Through Speaker Dependent and Independent Spectral Style Conversion." INTERSPEECH. 2020. http://www.interspeech2020.org/uploadfile/pdf/Mon-3-3-6.pdf). (Year: 2020).*

Doi, Hironori, et al. "Alaryngeal speech enhancement based on one-to-many eigenvoice conversion." IEEE/ACM Transactions on Audio, Speech, and Language Processing 22.1 (2013): 172-183. https://ieeexplore.ieee.org/stamp/stamp.jsp?tp=&arnumber=6645394 (Year: 2013).*

International Search Report and Written Opinion relating to Application No. PCT/US2022/020606, dated Jun. 28, 2022.

Fadi Biadsy et al:"Parrotron: An End-to-End Speech-to-Speech Conversion Model and its Applications to Hearing-Impaired Speech and Speech Separation", ARXIV.org <http://ARXIV.org>, Cornell University Library, 201 Olin Library Cornell University Ithaca, NY 14853,Apr. 8, 2019 (Apr. 8, 2019), XP081515314.

Anmol Gulati et al:"Conformer: Convolution-augmented Transformer for Speech Recognition", ARXIV.org <http://ARXIV.org>, Cornell University Library, 201 Olin Library Cornell University Ithaca, NY 14853, May 16, 2020(May 16, 2020), XP081674848, figure 1.

* cited by examiner

CONFORMER-BASED SPEECH CONVERSION MODEL

CROSS-REFERENCE TO RELATED APPLICATIONS

This U.S. Patent Application claims priority under 35 U.S.C. § 119(e) to U.S. Provisional Application 63/166,954, filed on Mar. 26, 2021, and U.S. Provisional Application 63/312,195, filed on Feb. 21, 2022. The disclosures of these prior applications are considered part of the disclosure of this application and are hereby incorporated by reference in their entireties.

TECHNICAL FIELD

This disclosure relates to a Conformer-based speech conversion model

BACKGROUND

Speech conversion models can be used to modify the speech of a source speaker into another form without changing the linguistic information of the speech. For example, a speech conversion model can produce a transcript of a user's speech. Alternatively, a speech conversion model can translate a user's speech into an audio waveform of the speech in another language. Machine learning methods can be used to train speech conversion models accurately and efficiently convert speech into another form.

SUMMARY

One aspect of the disclosure provides a speech conversion model that includes an encoder including a stack of self-attention blocks configured to encode an input spectrogram corresponding to an utterance. The speech conversion model further including a spectrogram decoder configured to receive, as input, the encoded spectrogram from the encoder. The spectrogram decoder further configured to generate, as output, an output spectrogram corresponding to a synthesized speech representation of the utterance.

Implementations of the disclosure may include one or more of the following optional features. In some implementations, the input spectrogram corresponding to the utterance is extracted from input speech spoken by a speaker associated with atypical speech. In these implementations, the synthesized speech representation of the utterance includes a synthesized canonical fluent speech representation of the utterance.

Further, the speech conversion model may include a word piece decoder configured to receive, as input, the encoded spectrogram from the encoder and generate, as output, a textual representation corresponding to a transcription of the utterance. Still further, the speech conversion model may include a phoneme decoder configured to receive, as input, the encoded spectrogram from the encoder and generate, as output, a phoneme representation of the utterance.

In some implementations, the stack of self-attention blocks includes a stack of Conformer blocks each having a multi-headed self-attention mechanism. In these implementations, the encoder may further include a first subsampling layer disposed before the stack of Conformer blocks and configured to receive the input spectrogram, the first subsampling layer including Convolution Neural Network (CNN) layers, followed by pooling in time to reduce a number of frames being processed by an initial Conformer block in the stack of Conformer blocks. Further, in these implementations, the encoder may include a second subsampling layer disposed between an initial set of Conformer blocks in the stack of Conformer blocks and a final set of Conformer blocks in the stack of Conformer blocks, the second subsampling layer configured to subsample hidden representations output by a last Conformer block in the initial set of Conformer blocks to reduce a number of frames being processed by the final set of Conformer blocks. In these implementations, the encoder may further include an upsampling layer disposed after the stack of Conformer blocks, the upsampling layer including a single transposed CNN layers configured to upsample hidden representations output by a final Conformer block in the stack of Conformer blocks to increase a number of frames being processed by a cross-attention mechanism disposed between the encoder and the spectrogram decoder.

Further the speech conversion model may be trained using a two-step training process including a first training step that pre-trains the speech conversion model on a plurality of spoken utterances by typical speakers associated with canonical fluent speech. Here, each spoken utterance is paired with a corresponding ground-truth synthesized canonical fluent speech representation of the utterance. The two-step training process further includes a second training step that fine-tunes parameters of the pre-trained speech conversional model based on a plurality of atypical speech samples spoken by a speaker associated with atypical speech.

In some implementations, the spectrogram decoder generates the output spectrogram from the encoded spectrogram directly without performing any intermediate text-to-speech conversion on a textual representation corresponding to a transcription of the utterance.

Another aspect of the disclosure provides a computer-implemented method for a speech conversion model. The computer-implemented method when executed on data processing hardware causes the data processing hardware to perform operations including receiving, as input to an encoder of a speech conversion model, an input spectrogram corresponding to an utterance, the encoder including a stack of self-attention blocks. The operations further include generating, as output from the encoder, an encoded spectrogram. The operations include receiving, as input to a spectrogram decoder of the speech conversion model, the encoded spectrogram generated as output from the encoder. The operations further include generating, as output from the spectrogram decoder, an output spectrogram corresponding to a synthesized speech representation of the utterance.

This aspect may include one or more of the following optional features. In some implementations, the input spectrogram corresponding to the utterance is extracted from input speech spoken by a speaker associated with atypical speech. In these implementations, the synthesized speech representation of the utterance includes a synthesized canonical fluent speech representation of the utterance.

In some implementations, the operations include receiving, as input to a word piece decoder of the speech conversion model, the encoded spectrogram generated as output from the encoder. These implementations further include generating, as output from the word piece decoder, a textual representation corresponding to a transcription of the utterance. The operations may further include receiving, as input to a phoneme decoder of the speech conversion model, the encoded spectrogram generated as output from the encoder and generating, as output from the phoneme decoder, a phoneme representation of the utterance.

In some implementations, the stack of self-attention blocks includes a stack of Conformer blocks each having a multi-headed self-attention mechanism. In these implementations, the encoder may further include a first subsampling layer disposed before the stack of Conformer blocks and configured to receive the input spectrogram, the first subsampling layer including Convolution Neural Network (CNN) layers, followed by pooling in time to reduce a number of frames being processed by an initial Conformer block in the stack of Conformer blocks. Further, in these implementations, the encoder may include a second subsampling layer disposed between an initial set of Conformer blocks in the stack of Conformer blocks and a final set of Conformer blocks in the stack of Conformer blocks, the second subsampling layer configured to subsample hidden representations output by a last Conformer block in the initial set of Conformer blocks to reduce a number of frames being processed by the final set of Conformer blocks. In these implementations, the encoder may further include an upsampling layer disposed after the stack of Conformer blocks, the upsampling layer including a single transposed CNN layers configured to upsample hidden representations output by a final Conformer block in the stack of Conformer blocks to increase a number of frames being processed by a cross-attention mechanism disposed between the encoder and the spectrogram decoder.

Further the speech conversion model may be trained using a two-step training process including a first training step that pre-trains the speech conversion model on a plurality of spoken utterances by typical speakers associated with canonical fluent speech. Here, each spoken utterance is paired with a corresponding ground-truth synthesized canonical fluent speech representation of the utterance. The two-step training process further includes a second training step that fine-tunes parameters of the pre-trained speech conversional model based on a plurality of atypical speech samples spoken by a speaker associated with atypical speech.

In some implementations, the spectrogram decoder generates the output spectrogram from the encoded spectrogram directly without performing any intermediate text-to-speech conversion on a textual representation corresponding to a transcription of the utterance.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
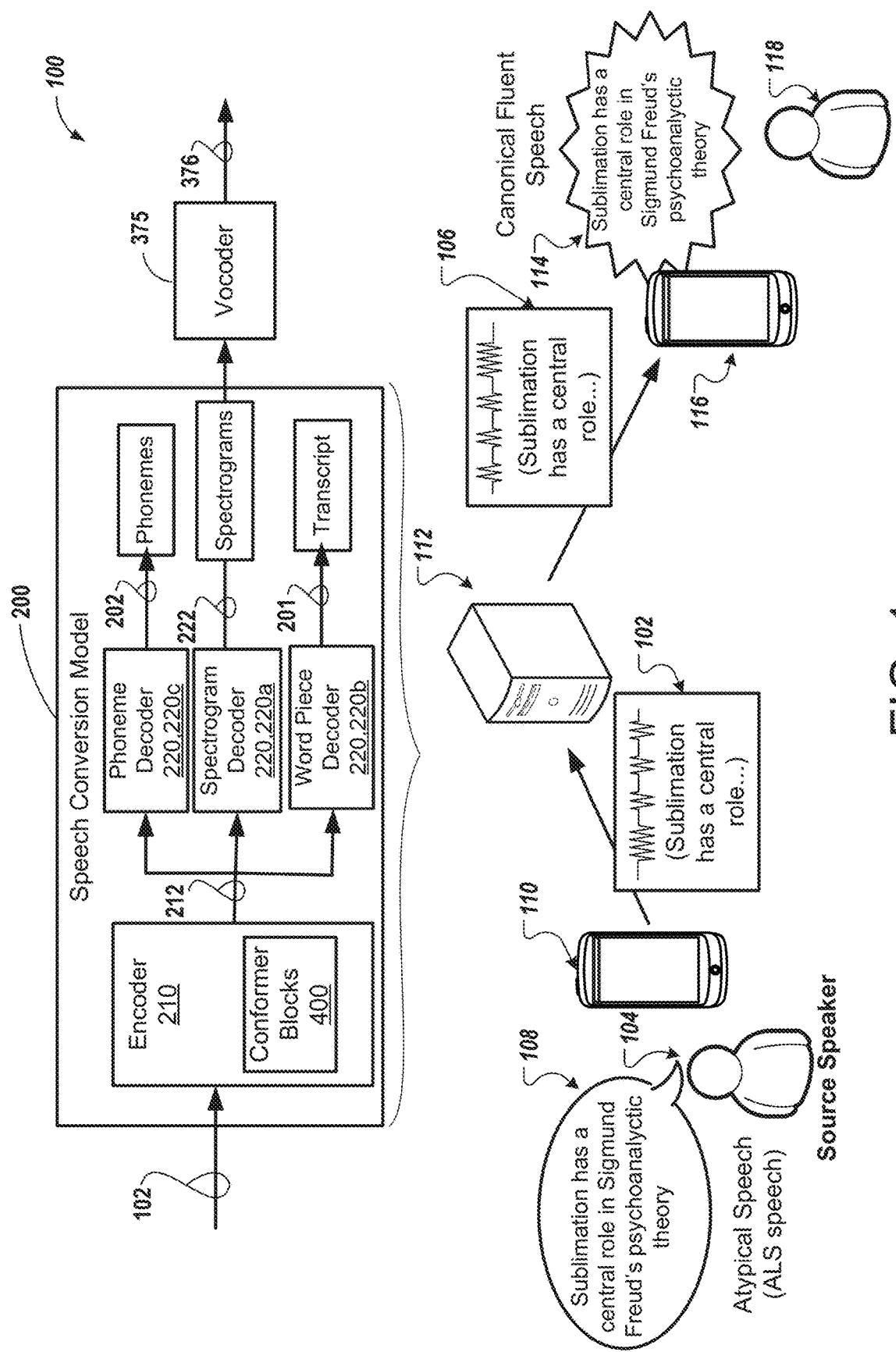
FIG. 1 is a schematic view of an example speech conversion system including a speech conversion model.

There is growing interest to develop more inclusive speech technologies, particularly those that can help people with speech impairments. Automated speech recognition (ASR) has made tremendous strides with the introduction of end-to-end (E2E) deep learning-based models to recognize speech from speakers with dysarthric or atypical speech patterns for conversion into accurate transcriptions. For instance, atypical speech patterns may include, without limitation, impaired speech due to physical or neurological conditions (e.g., speakers with Amyotrophic Lateral Sclerosis (ALS) disease), heavily-accented speech, and deaf speech. Similar deep learning-based models can be applied by speech conversion systems to convert speech with atypical speech patterns into canonical fluent output speech.

It is known that matched training and test data distributions yield optimal performance for training speech conversion models. However, it can be difficult to train models using current methodologies due to insufficient training data from speakers with speech impairments. Further, such training data is difficult to obtain as users with speech impairments can find it strenuous to record enough data to sufficiently train a model. The current disclosure introduces improvements to speech conversion models having an encoder/decoder architecture. These improvements require less training data, accelerate the training of the speech conversion model, allow the model to scale to a large set of users, and are robust to a wide range of atypical speech. The current disclosure provides for these improvements through architectural modifications to a speech conversion model using subsamples of encoder activations and corresponding upsampling of typical encoder outputs. The disclosure further provides for a combination of many-to-one voice conversion (VC) and ASR in a unified model that jointly decodes both speech and text during inference using a shared encoder architecture for the tasks.

As used herein, and unless specified otherwise, the terms "speech conversion system" and "speech conversion model" can refer to any combination of an ASR system/model, in which input atypical speech is recognized and converted into corresponding text (e.g., transcription) and/or a set of phonemes representing the atypical speech, or a speech-to-speech conversion system/model, in which the input atypical speech is directly converted into canonical fluent synthesized speech without performing speech recognition. Stated differently, the speech conversion system/model is configured to convert an input audio waveform or spectrograms corresponding to the atypical speech directly into an output audio waveform or spectrograms corresponding to the canonical fluent speech without converting the input audio waveform into an intermediate representation (e.g., text or phonemes). As will become apparent, speech conversion models, as well as techniques for training speech conversion models, will enable a user with atypical speech to speak to, and be understood by, both other humans and speech interfaces (e.g., digital assistants) by enabling recognition and/or reproduction of the user's intended speech. While examples herein depict a speech conversion model receiving an input audio waveform or spectrograms corresponding to atypical speech for conversion into an output audio waveform or spectrograms corresponding to canonical fluent speech, the speech conversion model can similarly be adapted to perform other types of voice conversion tasks without departing from the scope of the present disclosure. For instance, the speech conversion model may convert an input audio waveform or spectrograms corresponding to an utterance in a first language into an output audio waveform or spectrograms corresponding to a translation of the utterance in a different second language. The speech conversion model may similarly receive spoken inputs by a user and output synthesized speech that contains the same linguistic content of the spoken inputs but with different voice characteristics of a target speaker.

FIG. 1 illustrates a speech conversion system 100 including a speech conversion model 200 and a vocoder 374. The speech conversion model 200 is configured to convert input audio data 102 corresponding to an utterance 108 spoken by a source speaker 104 associated with atypical speech into output audio data 106 corresponding to a synthesized canonical fluent speech representation of the same utterance 114 spoken by the target speaker 104. As used herein, the input audio data 102 may include input spectrograms corresponding to the utterance 108. As used herein, the output audio data 106 may include output spectrograms 222 corresponding to the synthesized canonical fluent speech representation of the same utterance 114 or a time-domain audio waveform 376 converted from the output spectrograms 222 by a vocoder 375. While not shown, an acoustic front-end residing on the user device 110 may convert a time-domain audio waveform of the utterance 108 captured via a microphone of the user device 110 into the input spectrograms 102 or other type of audio data 102. In some implementations, the speech conversion model 200 converts the input audio data 102 corresponding to the utterance 108 into a textual representation (e.g., graphemes, word pieces, or words) corresponding to a transcription 201, or a phoneme representation 202 of the utterance 108. In some additional implementations, the speech conversion model 200 of the speech conversion system 100 is configured to convert the input audio data 102 (e.g., input spectrogram) directly into the output audio data 106 (e.g., output spectrogram 222) without performing speech recognition, or otherwise without requiring the generation of any intermediate discrete representations (e.g., text or phonemes) from the input audio data 102.

The speech conversion model 200 includes a spectrogram encoder 210 configured to encode the input spectrogram 102 into an encoded spectrogram 212 (e.g., a hidden feature representation including series of vectors) and one or more decoders 220, 220a-c configured to decode the encoded spectrogram 212 into the output spectrogram 222 corresponding to the synthesized canonical fluent speech representation, the transcription 201, and/or the phoneme representation 202. The transcript 201 may include a canonical fluent transcription of the utterance 108 that may be understood by a human reader and/or understood by a downstream application (e.g., a digital assistant).

The encoder 210 may include a stack of multi-head attention blocks 400 (referred to herein as conformer blocks 400) which may include conformers or transformers. Each multi-head attention block 400 may include a multi-head attention mechanism 420 (FIG. 4). The conformer blocks 400 may be implemented by the encoder 210 to capture the fine-grained spectral patters of incoming atypical speech. For instance, as the spectrogram encoder 210 receives the input audio data 102 of the utterance 108, the spectrogram encoder 210 may process a 10 millisecond (ms) speech sample of the input spectrogram 102 using the conformer blocks 400 to produce an upsampled 40 ms encoded spectrogram 212. The process of upsampling by the conformer blocks 400 of the encoder 210 is discussed in greater detail with respect to FIGS. 3 and 4 below. In turn, the spectrogram decoder 220a may generate the output spectrogram 222 corresponding to the synthesized canonical fluent speech representation based on the upsampled encoded spectrogram 212 output from the spectrogram encoder 210. For example, the spectrogram decoder 220a may receive the upsampled 40 ms encoded spectrogram 212 from the spectrogram encoder 210 that represents the 10 ms speech sample of the input spectrogram 102. Here, through a cross-attention mechanism 231, 231a (FIGS. 2 and 3), the spectrogram decoder 220a may generate 12.5 ms of output spectrogram 222 corresponding to the synthesized canonical fluent speech representation of the utterance 114 that includes the intended words or parts of words as the 10 ms of the input audio data 102, but without the disfluencies of the atypical speech.

In some examples, the speech conversion model 200 also includes a word piece decoder 220b that decodes the encoded spectrogram 212 into a textual representation, e.g., a transcription 201. For instance, the word piece decoder 220b may be trained to decode the encoded spectrograms 212 into corresponding word pieces that may form the transcription 201. While a word piece decoder 220b is employed by the model 200 in the example shown, the model 200 may instead employ a grapheme decoder 220b or word decoder 220b configured to decode the encoded spectrograms into graphemes or words, respectively. Additionally or alternatively, the speech conversion model 200 may also include a phoneme decoder 220c that decodes the encoded spectrograms 212 into a phoneme representation 202 including phonemes indicative of the synthesized canonical fluent speech representation of the utterance 114. Accordingly, the spectrogram, word piece, and phoneme decoders 220a-c may correspond to parallel decoding branches of the speech conversion model 200 that each receive the upsampled encoded spectrogram 212 encoded by the spectrogram encoder 210 and emit their respective ones of the output spectrograms 222, transcription 201, and phoneme representation 202 in parallel. The vocoder 375 (also referred to interchangeably as a synthesizer 375) of the speech conversion system 100 is configured to convert the output spectrogram 222 emitted by the spectrogram decoder 220a into a time-domain waveform 376 of synthesized canonical fluent speech of the same utterance 114 for audible output from another computing device 116. A time-domain audio waveform includes an audio waveform that defines an amplitude of an audio signal over time. The vocoder 375 may include a unit selection module or a WaveNet module for synthesizing the output spectrograms 222 into time-domain waveforms of synthesized canonical fluent speech. In some implementations, the synthesizer 375 includes a vocoder network, i.e., neural vocoder that is separately trained and conditioned on mel-frequency spectrograms for conversion into time-domain audio waveforms. In some additional examples, the vocoder 375 includes a streaming vocoder 375, such as a streaming Griffin-Lim vocoder. An example streaming vocoder is described in U.S. Provisional Application 63/312,105, filed on Feb. 21, 2022, the contents of which are incorporated by reference in their entirety.

In the example shown, the source speaker 104 is associated with atypical speech such that the source speaker 104 speaks with an atypical speech pattern that may be difficult to understand. Atypical speech patterns may include, without limitation, impaired speech due to physical or neurological conditions (e.g., speakers with Amyotrophic Lateral Sclerosis (ALS) disease), heavily-accented speech, and deaf speech. By way of example, the source speaker 104 has ALS disease and is associated with atypical speech due to ALS disease. The speech conversion model 200 is accordingly-trained to covert the input spectrogram 102 corresponding to the utterance 108 spoken by the source speaker 104 associated with ALS speech directly into the output spectrogram 222 corresponding to the synthesized canonical fluent speech representation of the same utterance 108. Thus, the synthesized canonical fluent speech representation provided by the output spectrogram 222 improves intelligibility of the ALS speech spoken by the source speaker 104. Without departing from the scope of the present disclosure, the speech conversion model 200 may be trained as a multilingual speech conversion model to convert input spectrograms 102 corresponding to utterances 108 in a first language directly into output spectrograms 222 corresponding to synthesized speech representations of those utterances 108 in the same voice as the source speaker, but in a different second language. Additionally, the model 20 may be trained to convert an input spectrogram 102 corresponding to an utterance 108 spoken by a source speaker with first voice characteristics directly into an output spectrogram 222 corresponding to a synthesized speech representation of the same utterance 108 with different voice characteristics corresponding to a target speaker.

A computing device 110 associated with the source speaker 104 may capture the utterance 108 spoken by the source speaker 104 and provide the corresponding input audio data 102 to the speech-to-speech conversion system 100 for conversion into any of the output spectrogram 222, the transcription 201, or the phoneme representation 202. The computing device 110 may include, without limitation, a smart phone, tablet, desktop/laptop computer, smart speaker, smart display, smart appliance, assistant-enabled wearable device (e.g., smart watch, smart headphones, smart glasses, etc.), or vehicle infotainment system. Thereafter, the speech conversion system 100 may employ the vocoder 375 to convert the output spectrogram 222 into a time-domain audio waveform 376 that may be audibly output from the computing device 110 or another computing device 116 as the utterance 114 of synthesized canonical fluent speech. Without departing from the scope of the present disclosure, the speech conversion system 100 may also provide the transcription 201 and/or phoneme representation 202 corresponding to the synthesized canonical fluent speech representation of the same utterance 114 spoken by the source speaker 104 to another computing device 116 associated with user 118, whereby the other computing device 116 could display the canonical transcription 201 as an intelligible representation of the utterance 108 spoken by the source speaker 104 and/or employ a text-to-speech (TTS) system for converting the transcription 201 or phoneme representation 202 in to synthesized canonical fluent speech. In this example, the source speaker 104 and the user 118 are speaking with each other through their respective computing devices 110, 116, such as over a telephone call or other type of voice communication protocol, for example, voice over internet protocol. While the source speaker 104 and the other user 118 may speak the same language, it may be difficult for the other user 118 to understand the source speaker 104 because the source speaker 104 has atypical speech due to a medical condition (e.g., atypical speech), heavy accent, or different native speaking language. Thus, while the source speaker 104 speaks with atypical speech (e.g., ALS speech) that may be difficult to understand, the other user 118 hearing the synthesized canonical fluent speech representation will have an easier time understanding the utterance 108 intended by the source speaker 104. Stated differently, the synthesized canonical fluent speech representation provides a more consistent cadence that may be easier for another user to understand than the original utterance 108 spoken by the target speaker with the atypical speech. Notably, the synthesized canonical fluent speech representation is in the voice of the source speaker 104. However, depending on the application, the speech conversion system 100 may produce synthesized canonical fluent speech in the voice of a target speaker having different voice characteristics than the source speaker.

In some additional examples, the speech conversion system 100 passes the output audio data 106 corresponding to the synthesized canonical fluent speech representation of the utterance spoken by the source speaker 104 to an output audio device for audibly outputting the synthesized canonical fluent speech representation in the voice of the source speaker 104 to an audience. For instance, the source tree speaker 104 may be a psychology professor providing a lecture to a class of students, in which utterances spoken by the source speaker 104 include medical terminology belonging to a particular specific domain, e.g., psychology. As will become apparent, the speech-to-speech conversion model 200 is trained to learn linguistic diversity associated with particular domains, as well as to learn acoustic diversity associated with particular types of atypical speech associated with source speakers 104.

Alternatively, the other computing device 116 may be associated with down-stream automated speech recognition (ASR) system in which the speech conversion system 100 functions as a front-end to provide the output audio data 106 corresponding to the synthesized canonical fluent speech representation as an input to the ASR system for conversion into recognized text. The recognized text could be presented to the other user 118 and/or could be provided to a natural language understanding (NLU) system for further processing. The functionality of the speech conversion system 100 can reside on a remote server 112, on either or both of the computing devices 110, 116, or any combination of the remote server and computing devices 110, 116. The speech conversion system 100 could be distributed across multiple devices such that the speech conversion model 200 resides on one of the computing device 110 or the remote server 112 and the vocoder 375 resides on one of the remote server 112 or the other computing device 116. In some implementations, the speech conversion model 200 continuously generates output spectrograms 222 corresponding to synthesized canonical fluent speech representations of an utterance as the source speaker 104 speaks corresponding portions of the utterance as atypical speech. By continuously generating output spectrograms 222 corresponding to synthesized canonical fluent speech representations of portions of the utterance 108 spoken by the source speaker 104, the conversation between the source speaker 104 and the user 118 (or audience) may be more naturally paced. In some additional implementations, the speech conversion model 200 waits to determine/detect when the source speaker 104 stops speaking, using techniques such as voice activity detection, end pointing, end of query detection, etc., and before converting the corresponding input audio data 102 of the utterance 108 with atypical speech into the corresponding output spectrograms 222 corresponding to synthesized canonical fluent speech representation of the same utterance 114.

Figure 2:
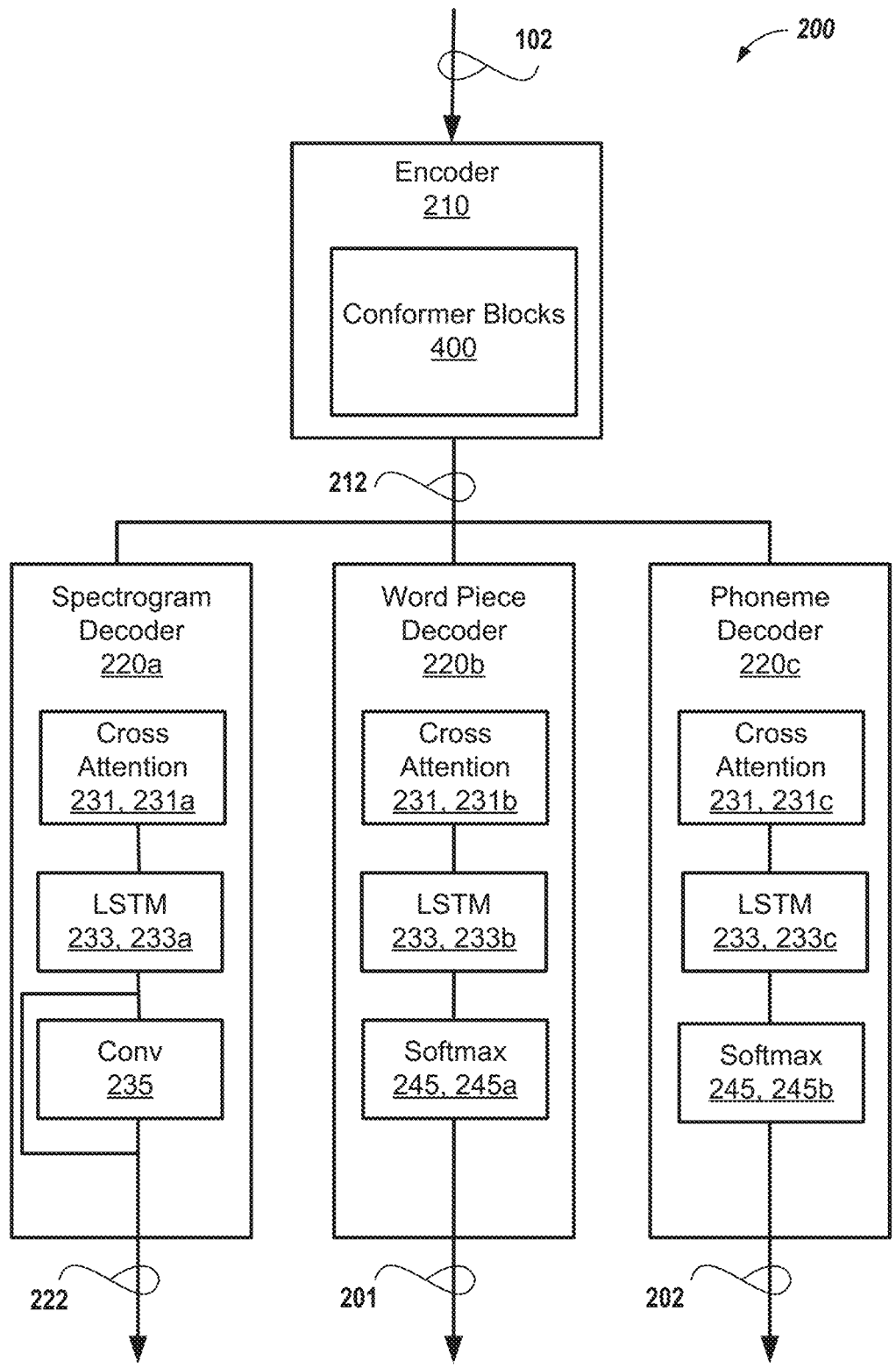
FIG. 2 is a schematic view of the speech conversion model.

FIG. 2 shows a schematic view of an example speech conversion model 200 used by the speech conversion system 100 of FIG. 1. The speech conversion model 200 includes the encoder 210 and one or more decoders 220, 220a-c. The encoder 210 is configured to encode the input audio data 102 into an encoded spectrogram 212. Here, the input audio data 102 includes a sequence of input spectrograms that correspond to the utterance 108 spoken by the source speaker 104. In some implementations, the encoder 210 includes a stack of Conformer blocks 400. In these implementations, the encoder subsamples the input audio data 102 using a convolutional layer, and then processes the input audio data 102 with the stack of Conformer blocks 400. Each Conformer block 400 may include a feed-forward layer, a self-attention layer, a convolution layer, and a second feed-forward layer. In some examples, the stack of Conformer blocks 400 includes 17 layers of Conformer blocks each with 512 states, 8 attention heads and 32×1 convolutional kernel size. FIG. 4 provides a schematic view of an example Conformer block. The encoder 210 may instead use a stack of transformer blocks or lightweight convolutional blocks in lieu of Conformer blocks.

The spectrogram, phoneme, and word piece decoders 220, 220a-c may each include recurrent neural network-based architectures that each receive the shared encoded spectrogram 212 output by the encoder 210. The spectrogram decoder 220a may include a cross-attention mechanism 231, 231a (also shown in FIG. 3) configured to receive the shared encoded spectrogram 212 from the encoder 210. The spectrogram decoder 220a may further process the shared encoded spectrogram 212 using a number of long-short term memory (LSTM) layers 233, 233a and a number of Convolutional layers 235. For example, the spectrogram decoder 220a may include five (5) LSTM layers 233a and five (5) conversion layers 235. The spectrogram decoder 220a may generate an output spectrogram 222. In some implementations, the spectrogram decoder 220a can generate the output spectrogram 222 from the encoded spectrogram 212 directly without performing any intermediate text-to-speech conversion on a textual representation corresponding to a transcription of the utterance.

In the example shown, the word piece decoder 220b includes a corresponding cross-attention mechanism 231, 231b configured to receive the shared encoded spectrogram from the encoder, followed by two long-short term memory (LSTM) layers 233, 233b and a Softmax layer 245, 245a that output the textual representation 201 corresponding to the transcription of the utterance.

Like the word piece decoder 220b, the phoneme decoder 220c may also include a cross-attention mechanism 231, 231c configured to receive the shared encoded spectrogram 212 from the encoder 210, followed by two long-short term memory (LSTM) layers 233, 233c and a Softmax layer 245, 245b that output a phoneme representation of the utterance 202.

Figure 3:
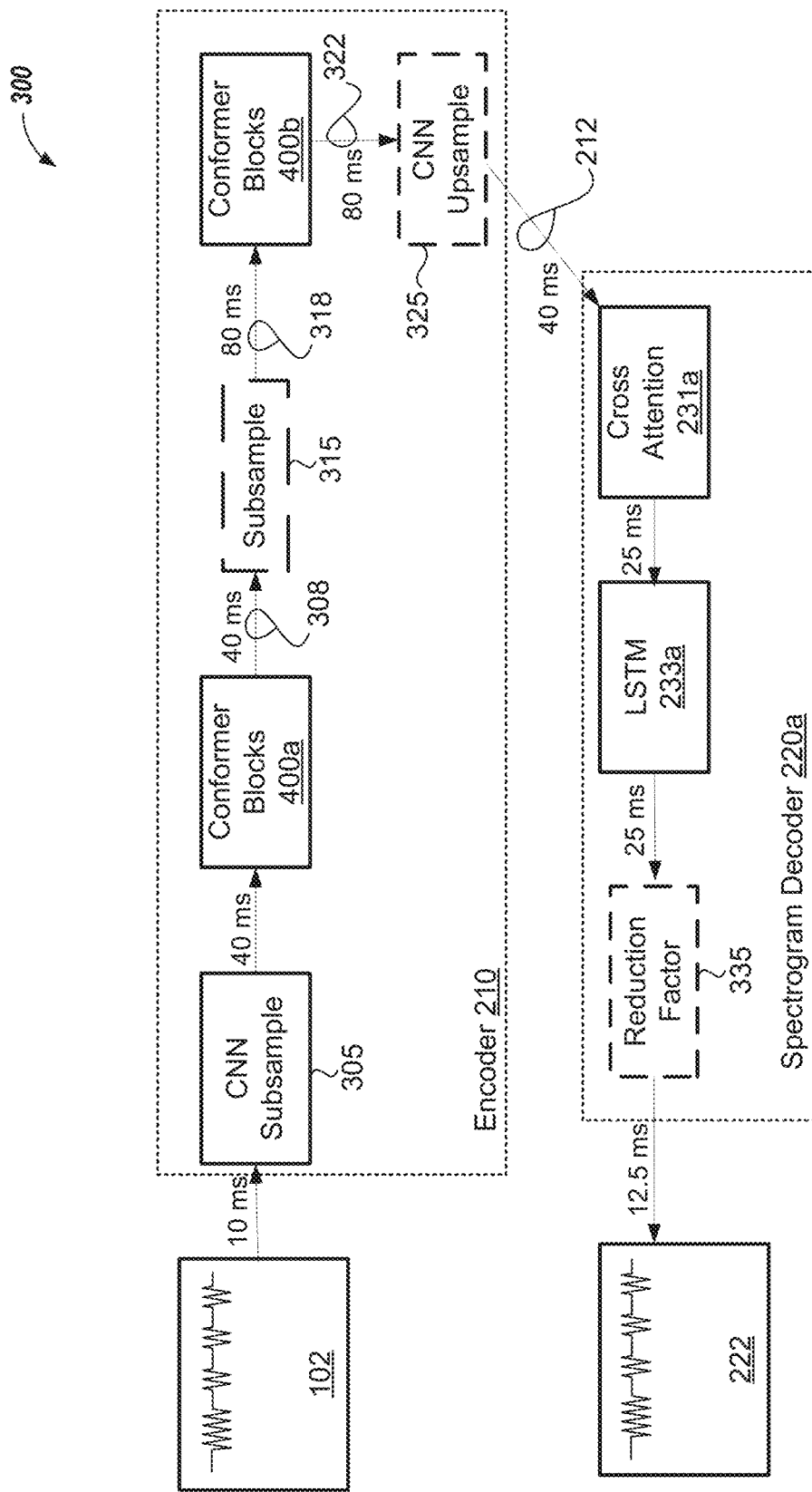
FIG. 3 is a schematic view of an example mixed-frame rate processing scheme for speeding up training and inference times of the speech conversion model.
Figure 4:
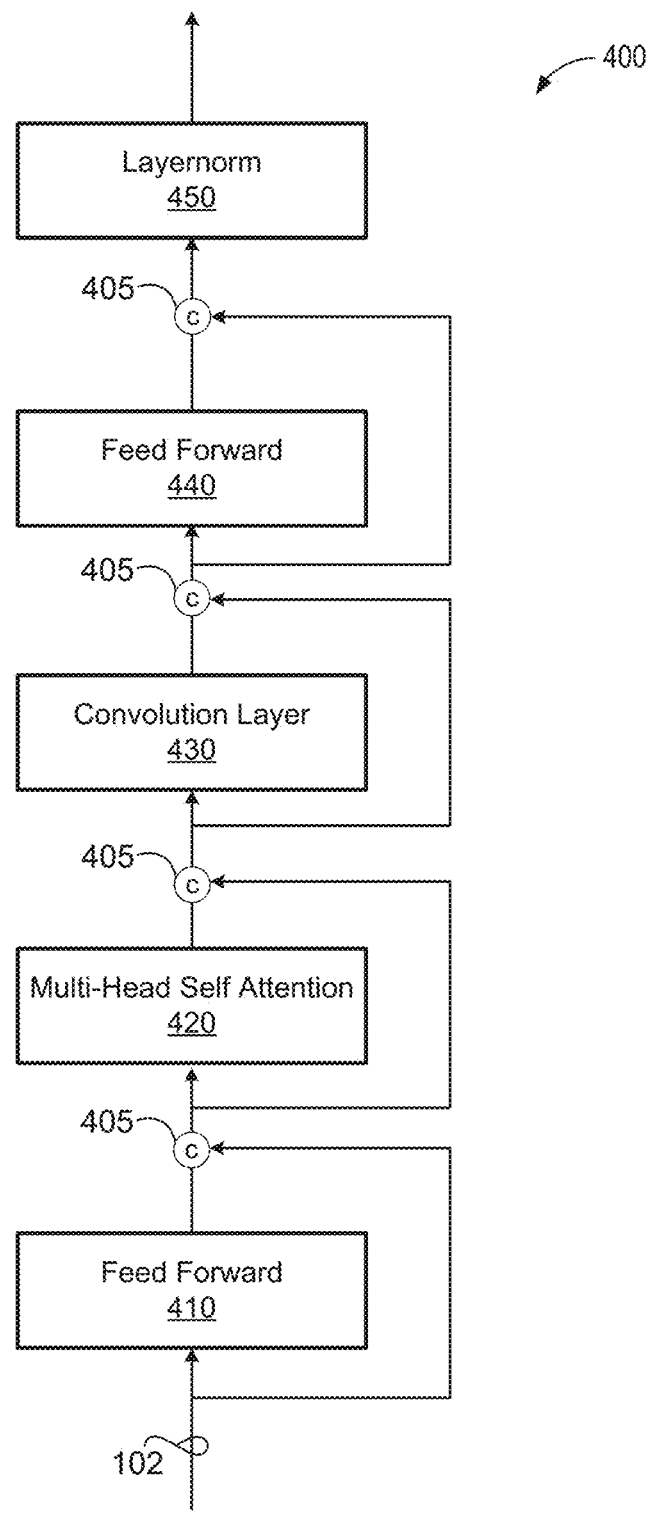
FIG. 4 is a schematic view of an example Conformer block.

FIG. 3 illustrates a schematic view 300 of an example mixed frame-rate processing scheme for expediting training and inference times of the speech conversion model 200 of FIG. 1. The mixed frame-rate processing scheme may improve memory consumption and training speeds for the encoder 220 in speech to speech processing (i.e., generating output spectrograms 222 via spectrogram decoder 220a). Unlike other models, such as automated speech recognition (ASR) or text to speech (TTS), where the predicted target or input sequences are text, a speech to speech conversion model uses acoustic frames as input sequences while also outputting a sequence of acoustic frames. As the output number of acoustic frames is much larger than that of text sequences, speech to speech conversion requires increased computation compared to ASR or TTS models. In some cases, the model complexity becomes a quadratic function based on the number of input frames due to the self-attention mechanisms of the encoder 210. Further, memory usage may be directly proportional to the length of the acoustic sequence, resulting in smaller batch size and slower training speed. A mixed frame-rate processing scheme, as illustrated in FIG. 3, may reduce the number of computations substantially and subsequently expedite training.

In some implementations, the mixed frame-rate processing scheme uses convolutional subsampling with a 3×5 kernel size and a 2×2 stride resulting in a subsampling factor of four. In these implementations, the transposed convolutional network includes one layer of a Convolution Neural Network (CNN) with 512 channels, a filter size of 4 and 2 strides in time. Further, the mixed frame-rate scheme may include extracting 128-dim log-mel spectrogram features from input speech using a 30 ms window and 10 ms frame shift, which may be provided to the encoder 210. In an example implementation, the spectrogram decoder 220a targets include 1025-dim Short-time Fourier transform (STFT) magnitudes, computed with a 50 ms frame length, 12.5 ms shift, and a 2048-point FFT.

The processing scheme may begin by the spectrogram encoder 210 receiving a 10 millisecond (ms) speech sample of the input spectrogram 102. The encoder 210 may first process the 10 ms speech sample using a first subsampling layer 305 including a number of CNN layers. The subsampling by the first subsampling layer 305 is implemented using the CNN layers followed by pooling in time to reduce a number of frames being processed by an initial conformer block in the stack of conformer blocks 400, 400a-b. The CNN may subsample the 10 ms speech into a 40 ms representation which is then provided to an initial set of conformer blocks 400a. The initial set of conformer blocks 400a may process the 40 ms representation which is subsequently provided to a second subsampling layer 315. The second subsampling layer 315 may be disposed between the initial set of conformer blocks 400a and a final set of conformer blocks 400b. In some examples, the initial set of conformer blocks 400a includes four conformer blocks and the final set of conformer-blocks 400b includes 13 conformer blocks, such that the total number of conformer blocks of the encoder 210 is 17. Here, the second subsampling layer 315 may be configured to subsample hidden representations 308 output by a last conformer block in the initial set of conformer blocks 400a to reduce a number of frames being processed by the final set of conformer blocks 400b. For instance, the second subsampling layer 315 may be configured to subsample the 40 ms hidden representations 308 output by the initial set of conformer blocks 400a into corresponding 80 ms representations 318. At the end of the final conformer block of the final set of conformer blocks 400b, the encoder 210 upsamples 80 ms hidden representations 322 using an upsampling layer 325. The upsampling layer 325 may include a single transposed CNN layer configured to upsample the 80 ms hidden representations 322 output by the final conformer block of the final set of conformer blocks 400b into corresponding 40 ms representations of the encoded spectrogram 212 to increase a number of frames for the encoded spectrogram 212.

The encoded spectrogram 212 may be received by a cross-attention mechanism 231a disposed between the encoder 210 and the spectrogram decoder 220a. In some implementations, the cross-attention mechanism 231a is included in the spectrogram decoder 220a. The spectrogram decoder 220a may reduce the 40 ms representation of the encoded spectrogram 212 into a 25 ms representation using the cross attention mechanism 231a, which may then be provided to the LSTM 233a. An output of the LSTM 233a may be reduced by a reduction factor 335, and the spectrogram decoder 220a may output the resulting output spectrogram 222 at a final size of 12.5 ms. The output spectrogram 222 may be provided to the vocoder 375 (FIG. 1) for conversion into a corresponding time-domain audio waveform of synthesized speech.

The above example is not intended to be limiting. The encoder 210 may receive a speech sample of any appropriate length for processing. The encoder 210 may then process, subsample, or upsample the speech sample to produce the encoded spectrogram 212, which may be any appropriate length. Similarly, the decoder 220a may then process the encoded spectrogram 212 to produce an output spectrogram 222 of an appropriate length.

In trials, given the same encoder frame shift, the mixed frame-rate scheme enables different realizations by different subsampling and upsampling setups. For example, increased subsampling generally results in expedited training but causes regressions in spectrogram WERs that are harder to recover through upsampling. The information loss may be assessed based on the sparsity of the feed-forward neural network weight matrices in the final Conformer block of the final set of conformer blocks 400b of the encoder 210. A cumulative proportion of variance (CPV) may be calculated through the following formula:

$$CPV(k) = \sum_{i=1}^{k} \frac{s_i^2}{\sum_{d=1}^{D} s_d^2} \qquad (1)$$

Where $s_i$ is the i-th singular value of the matrix, k is the number of singular values we consider, and D is the size of the feed-forward matrix (D=512). For any given k, a larger CPV shows that the network is able to learn the structure of the data with a sparsity index of k. A smaller value of k indicates a sparser matrix structure.

FIG. 4 provides an example of a Conformer block 400 from the stack of Conformer layers of the encoder 210. The Conformer block 400 includes a first half feed-forward layer 410, a second half feed-forward layer 440, with a multi-head self-attention block 420 and a convolution layer 430 disposed between the first and second half feed-forward layers 410, 440, and concatenation operators 405 The first half feed-forward layer 410 processes the input audio data 102 including the input mel-spectrogram sequence. Subsequently, the multi-head self-attention block 420 receives the input audio data 102 concatenated with the output of the first half-feed forward layer 410. Intuitively, the role of the multi-head self-attention block 420 is to summarize noise context separately for each input frame that is to be enhanced. A convolution layer 430 subsamples the output of the multi-head self-attention block 420 concatenated with the output of the first half feed forward layer 410. Thereafter, a second half-feed forward layer 440 receives a concatenation of the convolution layer 430 output and the multi-head self-attention block 420. A layernorm module 450 processes the output from the second half feed-forward layer 440. Mathematically, the conformer block 400 transforms input features x, using modulation features m, to produce output features y, as follows:

$\hat{x}=x+r(m)\odot x+h(m)$ $\tilde{x}=\hat{x}+\frac{1}{2}FFN(\hat{x}), \tilde{n}=n+\frac{1}{2}FFN(n)$ $x'=\tilde{x}+Conv(\tilde{x}), n'=\tilde{n}+Conv(\tilde{n})$ $x''=x'+MHCA(x',n')$ $x'''x'\odot r(x'')+h(x'')$ $x''''=x'+MHCA(x',x''')$ $y=LayerNorm(x''''+\frac{1}{2}FFN(x''''))$ \qquad (2)

Figure 5:
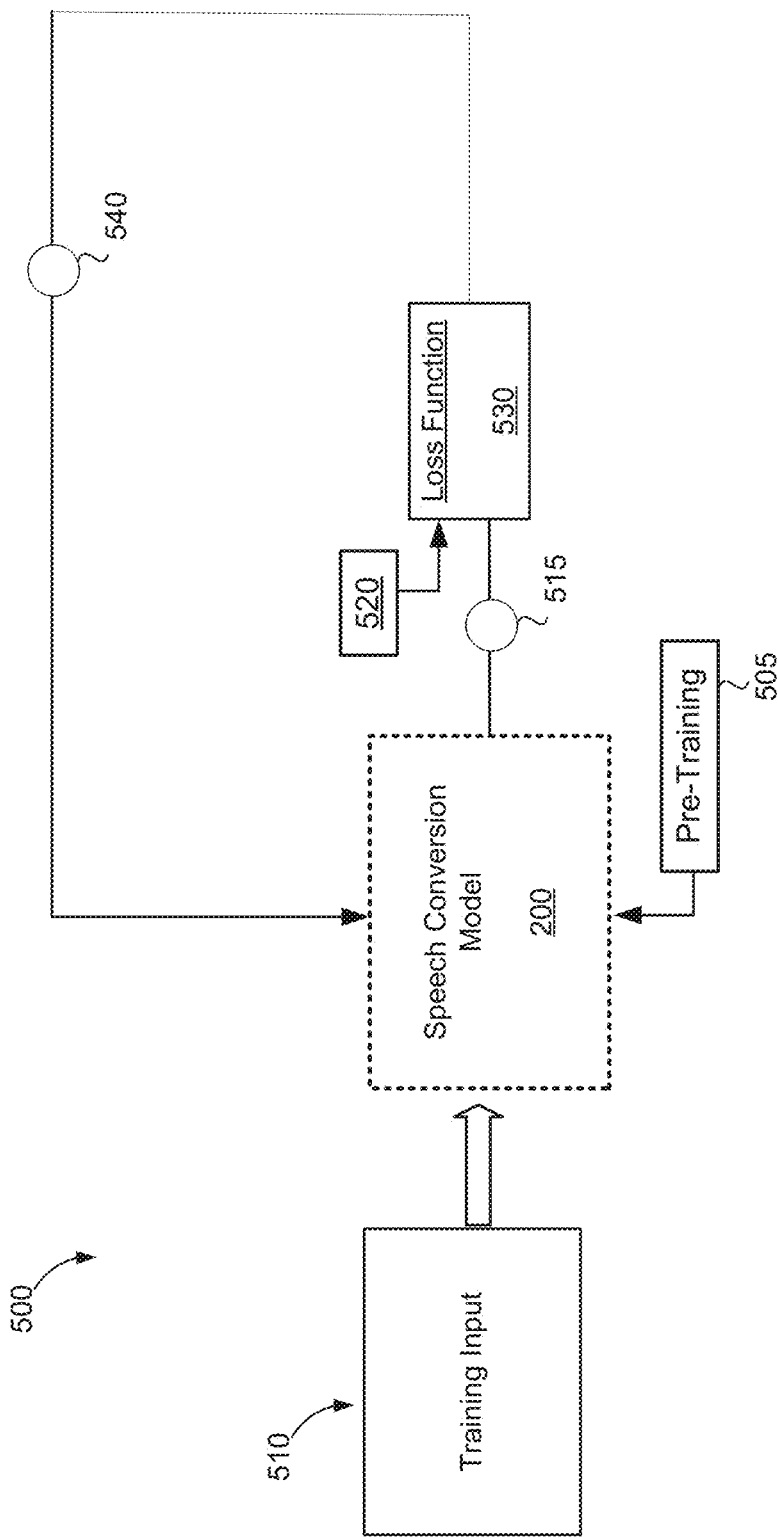
FIG. 5 is a schematic view of an example training scheme for the speech conversion model.

FIG. 5 illustrates a training process 500 for a speech conversion model 200. In some implementations, the process 500 employs a two-step training technique First, the speech conversion model 200 is pre-trained on typical speech from a large pool of speakers to obtain a many-to-one speech conversion model 200, resulting in speaker-independent ASR/conversion base model. The target speech used for training may be speech synthesized from the reference transcripts in a predetermined voice that is reflective of typical speech. To achieve personalization, any parameters of the base model may be fine-tuned to the speech from a single input speaker (e.g., a deaf speaker) obtaining a one-to-one speech conversion model from atypical to typical speech (and a speaker-dependent ASR) model.

Referring to FIG. 5, the process 500 starts with pre-training the speech conversion model 200 using pre-training data 505. Pre-training a model is a technique used for initializing a model which can then be further fine-tuned based on additional training data 510. For the speech conversion model 200, pre-training may include initiating the speech conversion model 200 with pre-training data 505 including a plurality of spoken utterances by typical speakers associated with canonical fluent speech. Pre-training data 505 may further include the spoken utterances paired with corresponding ground-truth synthesized canonical fluent speech representations of the spoken utterances.

The process 500 can then fine-tune parameters of the pre-trained speech conversion model 200 for atypical speech. The training process may include training any of the encoder 210 or decoders 220, 220a-c separately or jointly in any suitable combination. The process 500 includes feeding a training input 510 to the speech conversion model 200. In some implementations, the training input 510 includes a plurality of atypical speech samples spoken by one or more speakers associated with atypical speech. Further, the training input 510 may be labeled using label 520 indicating a target output associated with the training input 510. Upon receiving the training input 510, the speech conversion model 200 may generate an output 515 (e.g., a transcript 201, a phoneme representation 202, an output spectrogram 222). The speech conversion model 200 may process the training input 510 in the manner described with respect to any of FIGS. 2-4 or any other suitable manner for speech conversion.

In some implementations, the output 515 is used by a loss function 530 to generate a loss 540. That is, the loss function 530 compares the output 515 and the label 520 to generate the loss 540, where the loss 540 indicates a discrepancy between the label 520 (i.e., the target output) and the output 515. The loss functions 350 may implement any suitable technique to determine a loss such as regression loss, mean squared error, mean squared logarithmic error, mean absolute error, binary classification, binary cross entropy, hinge loss, multi-class loss, etc. The loss 540 may then be fed directly to the speech conversion model 200. Here, the speech conversion model 200 processes the loss 540 and adjusts one or more parameters of the speech conversion model 200 to account for the loss 540.

Figure 6:
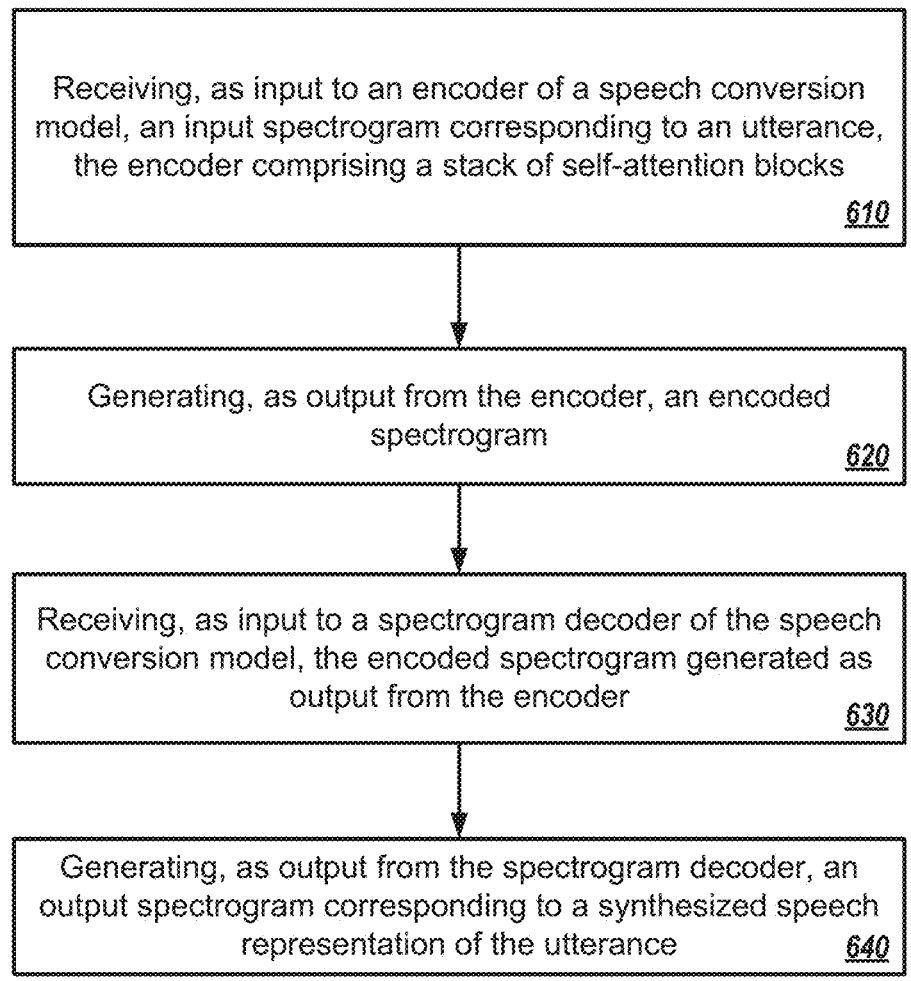
FIG. 6 is a flowchart of an example arrangement of operations for a method of performing speech conversion.

FIG. 6 is a flow chart of an exemplary arrangement of operations for a computer-implemented method 600 for performing speech conversion. The method 600 may be performed, for example, by various elements of the example speech conversion system 100 of FIG. 1. At operation 610, the method includes receiving, as input to an encoder 210 of a speech conversion model 200, an input spectrogram 102 corresponding to an utterance 108, the encoder 210 including a stack of self-attention blocks 400. At operation 620, the method 600 includes generating, as output from the encoder 210, an encoded spectrogram 212. At operation 630, the method 600 includes receiving, as input to a spectrogram decoder 220a of the speech conversion model 200, the encoded spectrogram 212 generated as output from the encoder 210. At operation 640, the method 600 includes generating, as output from the spectrogram decoder 220a, an output spectrogram 222 corresponding to a synthesized canonical fluent speech representation of the same utterance 114.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 7:
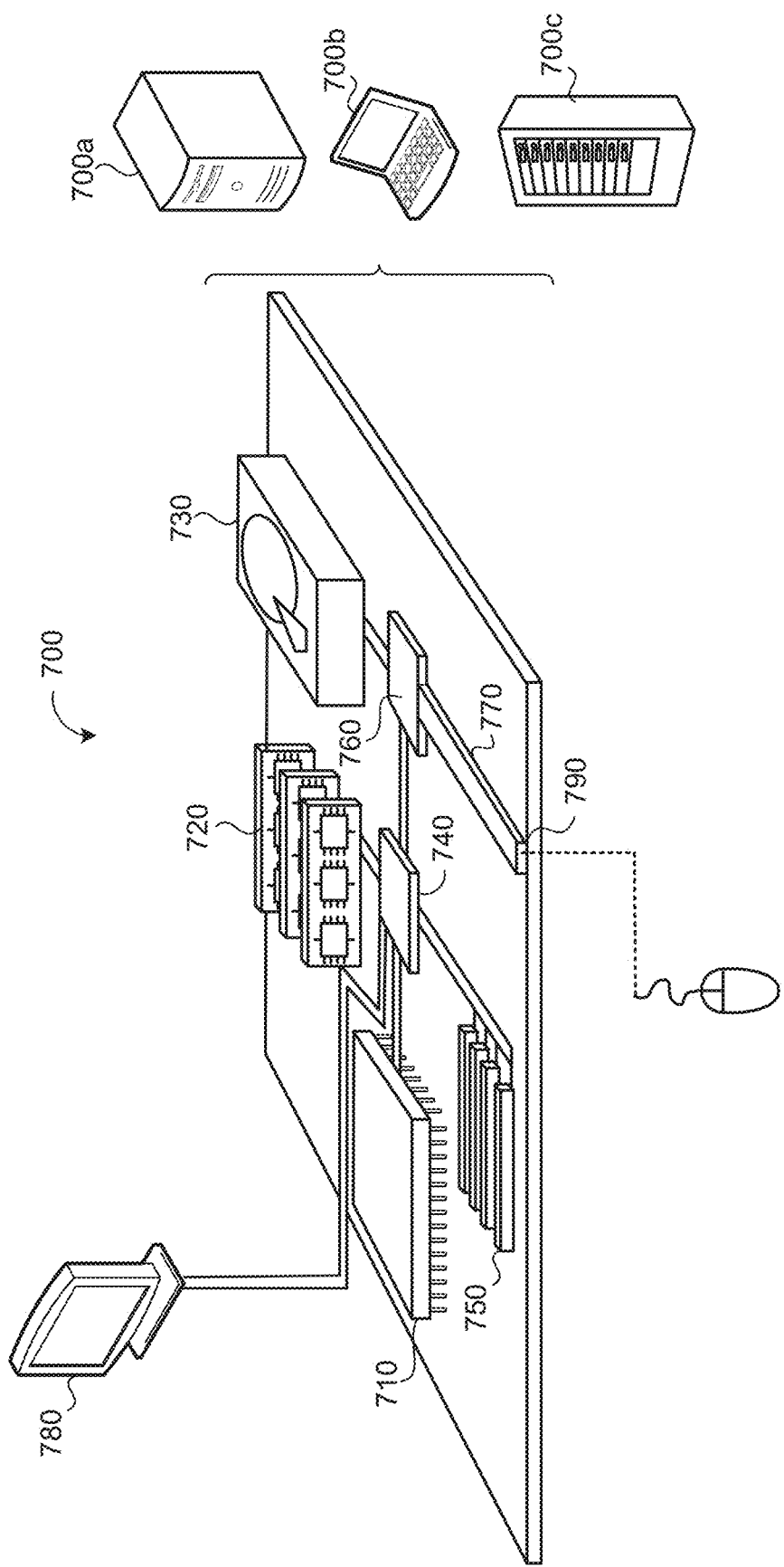
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion) port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received front the web browser.

A number of implementations have been described. Nevertheless, it will be understood that various modifications may be made without departing from the spirit and scope of the disclosure. Accordingly, other implementations are within the scope of the following claims.

What is claimed is:

1. A system comprising data processing hardware and memory hardware in communication with the data processing hardware and storing instructions that when executed by the data processing hardware causes the data processing hardware to perform operations for executing a speech conversion system, the speech conversion system comprising:
   an encoder configured to encode an input spectrogram corresponding to an utterance, the input spectrogram extracted from input speech spoken by a source speaker with atypical speech and comprising a sequence of spectrogram frames having a length equal to a first value, the encoder comprising:
      a first subsampling layer configured to subsample the sequence of spectrogram frames to increase the length of the sequence of spectrogram frames to a second value greater than the first value;
      a stack of self-attention blocks comprising an initial set of self-attention blocks and a final set of self-attention blocks, the initial set of self-attention blocks is configured to process the subsampled sequence of spectrogram frames output by the first subsampling layer to output first hidden representations having a length equal to the second value; and
      a second subsampling layer configured to subsample the first hidden representations output by the initial set of self-attention blocks to increase the length of the first hidden representations to a third value greater than the second value, wherein the final set of self-attention blocks is configured to process the subsampled first hidden representations output by the initial set of self-attention blocks to output second hidden representations having a length equal to the third value; and
   a spectrogram decoder configured to:
      receive, as input, the encoded spectrogram from the encoder; and
      generate, as output, an output spectrogram corresponding to a synthesized speech representation of the utterance comprising a synthesized canonical fluent speech representation of the utterance in a voice of the source speaker.

2. The speech conversion system of claim 1, further comprising a word piece decoder configured to:
   receive, as input, the encoded spectrogram from the encoder; and
   generate, as output, a textual representation corresponding to a transcription of the utterance.

3. The speech conversion system of claim 1, further comprising a phoneme decoder configured to:
   receive, as input, the encoded spectrogram from the encoder; and
   generate, as output, a phoneme representation of the utterance.

4. The speech conversion system of claim 1, wherein the stack of self-attention blocks comprises a stack of Conformer blocks each having a multi-headed self-attention mechanism.

5. The speech conversion system of claim 4, wherein the first subsampling layer is disposed before the stack of self-attention blocks, the first subsampling layer comprising Convolution Neural Network (CNN) layers, followed by pooling in time.

6. The speech conversion system of claim 5, wherein the second subsampling layer is disposed between the initial set of self-attention blocks in the stack of self-attention blocks and the final set of self-attention blocks in the stack of self-attention blocks.

7. The speech conversion system of claim 6, wherein the encoder further comprises an upsampling layer disposed after the stack of self-attention blocks, the upsampling layer comprising a single transposed CNN layers configured to upsample hidden representations output by the final set of self-attention blocks in the stack of self-attention blocks to increase a number of frames being processed by a cross-attention mechanism disposed between the encoder and the spectrogram decoder.

8. The speech conversion system of claim 1, wherein the speech conversion system is trained using a two-step training process comprising:
a first training step that pre-trains the speech conversion system on a plurality of spoken utterances by typical speakers associated with canonical fluent speech, each spoken utterance paired with a corresponding ground-truth synthesized canonical fluent speech representation of the utterance; and
a second training step that fine-tunes parameters of the pre-trained speech conversion system based on a plurality of atypical speech samples spoken by atypical speakers associated with atypical speech.

9. The speech conversion system of claim 1, wherein the spectrogram decoder generates the output spectrogram from the encoded spectrogram directly without performing any intermediate text-to-speech conversion on a textual representation corresponding to a transcription of the utterance.

10. A computer-implemented method that when executed on data processing hardware causes the data processing hardware to perform operations comprising:
receiving, as input to an encoder of a speech conversion system, an input spectrogram corresponding to an utterance, the input spectrogram extracted from input speech spoken by a source speaker with atypical speech and comprising a sequence of spectrogram frames having a length equal to a first value;
subsampling, using a first subsampling layer of the encoder, the sequence of spectrogram frames to increase the length of the sequence of spectrogram frames to a second value greater than the first value;
processing, using an initial set of self-attention blocks of a stack of self-attention blocks of the encoder, the subsampled sequence of spectrogram frames output by the first subsampling layer to output first hidden representations having a length equal to the second value;
subsampling, using a second subsampling layer of the encoder, the first hidden representations output by the initial set of self-attention blocks to increase the length of the first hidden representations to a third value greater than the second value;
processing, using a final set of self-attention blocks of the stack of self-attention blocks of the encoder, the subsampled first hidden representations output by the initial set of self-attention blocks to output second hidden representations having a length equal to the third value;
generating, as output from the encoder, an encoded spectrogram based on the second hidden representations;
receiving, as input to a spectrogram decoder of the speech conversion system, the encoded spectrogram generated as output from the encoder; and
generating, as output from the spectrogram decoder, an output spectrogram corresponding to a synthesized speech representation of the utterance comprising a synthesized canonical fluent speech representation of the utterance in a voice of the source speaker.

11. The method of claim 10, wherein the operations further comprise:
receiving, as input to a word piece decoder of the speech conversion system, the encoded spectrogram generated as output from the encoder; and
generating, as output from the word piece decoder, a textual representation corresponding to a transcription of the utterance.

12. The method of claim 10, wherein the operations further comprise:
receiving, as input to a phoneme decoder of the speech conversion system, the encoded spectrogram generated as output from the encoder; and
generating, as output from the phoneme decoder, a phoneme representation of the utterance.

13. The method of claim 10, wherein the stack of self-attention blocks of the encoder comprises a stack of Conformer blocks each having a multi-headed self-attention mechanism.

14. The method of claim 13, wherein the first subsampling layer is disposed before the stack of self-attention blocks, the first subsampling layer comprising Convolution Neural Network (CNN) layers, followed by pooling in time.

15. The method of claim 14, wherein the second subsampling layer is disposed between the initial set of self-attention blocks in the stack of self-attention blocks and the final set of self-attention blocks in the stack of self-attention blocks.

16. The method of claim 15, wherein the encoder further comprises an upsampling layer disposed after the stack of self-attention blocks, the upsampling layer comprising a single transposed CNN layers configured to upsample hidden representations output by the final set of self-attention blocks in the stack of self-attention blocks to increase a number of frames being processed by a cross-attention mechanism disposed between the encoder and the spectrogram decoder.

17. The method of claim 10, wherein the speech conversion system is trained using a two-step training process comprising:
a first training step that pre-trains the speech conversion system on a plurality of spoken utterances by typical speakers associated with canonical fluent speech, each spoken utterance paired with a corresponding ground-truth synthesized canonical fluent speech representation of the utterance; and
a second training step that fine-tunes parameters of the pre-trained speech conversion system based on a plurality of atypical speech samples spoken by atypical speakers associated with atypical speech.

18. The method of claim 10, wherein generating the output spectrogram from the encoded spectrogram comprises generating the output spectrogram from the input spectrogram directly without performing any intermediate text-to-speech conversion on a textual representation corresponding to a transcription of the utterance.

* * * * *